(12) United States Patent
Gustafsson et al.

(10) Patent No.: US 8,407,728 B2
(45) Date of Patent: Mar. 26, 2013

(54) DATA FLOW NETWORK

(75) Inventors: Niklas Gustafsson, Bellevue, WA (US); David Callahan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1254 days.

(21) Appl. No.: 12/131,449

(22) Filed: Jun. 2, 2008

(65) Prior Publication Data
US 2009/0300650 A1 Dec. 3, 2009

(51) Int. Cl.
*G06F 9/46* (2006.01)
*G06F 15/16* (2006.01)

(52) U.S. Cl. ............ 719/328; 709/227; 718/104

(58) Field of Classification Search ........... 709/227; 718/104; 719/328
See application file for complete search history.

(56) References Cited

U.S. PATENT DOCUMENTS

| | | | |
|---|---|---|---|
| 5,625,775 A | 4/1997 | Davis et al. | |
| 6,457,081 B1 | 9/2002 | Gulick | |
| 6,516,322 B1 | 2/2003 | Meredith et al. | |
| 7,055,142 B2 | 5/2006 | Meredith et al. | |
| 7,707,194 B2* | 4/2010 | Bresch et al. | 707/704 |
| 2004/0184470 A1 | 9/2004 | Holden | |
| 2005/0131978 A1 | 6/2005 | Meredith et al. | |
| 2005/0182614 A1 | 8/2005 | Meredith et al. | |
| 2005/0204367 A1* | 9/2005 | Minium et al. | 719/328 |
| 2005/0234902 A1 | 10/2005 | Meredith et al. | |
| 2005/0251537 A1* | 11/2005 | Schwols et al. | 707/200 |
| 2005/0289160 A1 | 12/2005 | Ashwin et al. | |
| 2006/0230411 A1* | 10/2006 | Richter et al. | 719/328 |
| 2007/0226217 A1* | 9/2007 | Chatterjee et al. | 707/8 |
| 2007/0250806 A1 | 10/2007 | Mejri et al. | |
| 2009/0006402 A1* | 1/2009 | Bohle et al. | 707/8 |

FOREIGN PATENT DOCUMENTS

| | | |
|---|---|---|
| CN | 1716249 | 1/2006 |
| EP | 01720104 | 11/2006 |

OTHER PUBLICATIONS

Freitas et al., "Jack: A Framework for Process Algebra Implementation in Java", Federal University of Pernambuco, Brazil, Date: Aug. 2, 2002, pp. 1-16.
Garavel et al., "State Space Reduction for Process Algebra Specifications", Date: Feb. 21, 2006, pp. 131-145, vol. 351, Issue 2, pp. 131-145.
PCT Search Report for Application No. PCT/US2009/043112 mailed on Dec. 24, 2009 (11 pages).
Bernardeschi, et al., "Using Process Algebras for the Semantic Analysis of Data Flow Networks", Retrieved at <http://dcl.isti.cnr.it/Documentation/Papers/file-BBS95-TIS-38.pdf>, IEICE Transactions, vol. 78-D, No.8, 1995, pp. 1-9.
Koo, et al., "Algebra of Systems: An Executable Framework for Model Synthesis and Evaluation", Retrieved at <http://opn.mit.edu/images/AlgebraOfSystems_ICSEM07.pdf>>, Proceedings of the International Conference on Systems Engineering and Modeling, 2007, pp. 8.
Tasharofi, et al., "Modeling Web Service Interactions Using the Coordination Language Reo," Web Services and Formal Methods, Lecture Notes in Computer Science, 4937, pp. 108-123 (Sep. 28, 2007).

(Continued)

*Primary Examiner* — Charles E Anya (57) ABSTRACT

A compositional model referred to as a source-target pattern for connecting processes into process networks in a general, flexible, and extensible manner is provided. The model allows common process algebra constructs to be combined with data flow networks to form process networks. Process algebraic operations may be expressed in terms of the compositional model to form data flow networks that provide fully interoperable process algebraic operations between processes.

20 Claims, 9 Drawing Sheets

OTHER PUBLICATIONS

Rouached, et al., "Towards Formal Verification of Web Service Composition," Business Process Management Lecture Notes in Computer Science, 4102, pp. 257-273 (Jan. 1, 2006).

The Supplemental European Search Report for Application No. EP 09 75 8922 mailed Sep. 28, 2012 (5 pages).

International Preliminary Report on Patentability for International Application No. PCT/US2009/043112 mailed Dec. 16, 2010 (6 pages).

* cited by examiner

DATA FLOW NETWORK

BACKGROUND

Computer systems may allow multiple processes of a program to be executed concurrently. Concurrent execution of the processes may allow the program to be executed faster or more efficiently to increase the throughput of the computer system.

In processes that implement a control flow model, control flow logic describes a set of conditions and modifications of program state and may be organized by a flow chart, for example. The term 'process algebra' is used to refer to a methodology for reasoning about how processes communicate with each other to cooperate on solving a shared problem and how the lifetime of a process is controlled. Although the process algebra may be largely distinct from the internal state-modifying primitives of a process, there are typically interaction points where inter-process communication drives the internal flow chart. These interaction points between processes may be complex in some programs. The complex interaction points may make it difficult to schedule processes for concurrent execution and result in an execution of the program that is less than optimal.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A compositional model referred to as a source-target pattern for connecting processes into process networks in a general, flexible, and extensible manner is provided. The model allows common process algebra constructs to be combined with data flow networks to form process networks. Process algebraic operations may be expressed in terms of the compositional model to form data flow networks that provide fully interoperable process algebraic operations between processes. The model may be applied to a wide array of simple data flow networks as well as more complex data flow networks.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown, by way of illustration, specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1A:
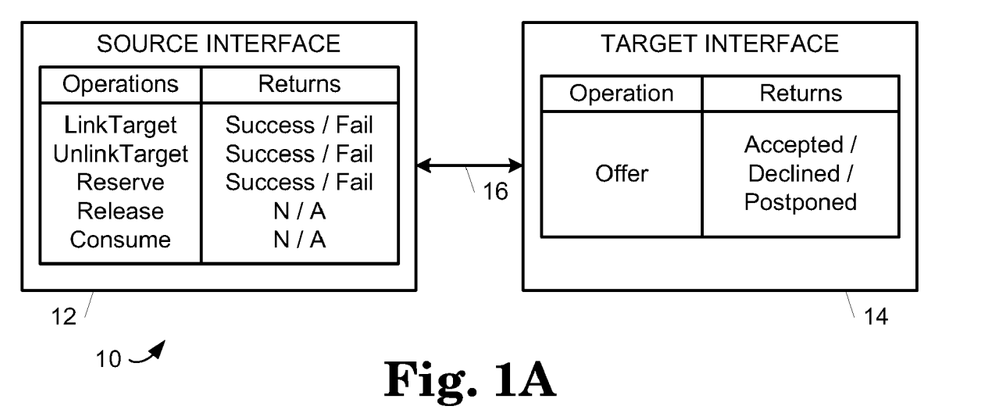
FIGS. 1A-1C are block diagrams illustrating embodiments of source and target interfaces for use in a data flow network.

FIG. 1A is a block diagram illustrating an embodiment of a source-target pattern 10 that includes a source interface 12 and a target interface 14 connected by a link 16.

Source-target pattern 10 provides a set of operations that are used to create data flow networks (e.g., data flow network 32 shown in FIGS. 3 and 4) that connect any number of processes (e.g., processes 40 shown in FIGS. 3 and 4) of a program executing on a computer system (e.g., a computer system 100 shown in FIG. 11) into process networks. The data flow networks form process algebra constructs such as send, receive, choice, join, and combinations thereof to allow data to be transferred between processes. Source-target pattern 10 provides a protocol for transferring data between source interface 12 and target interface 14 to allow the process algebra constructs to be implemented in data flow networks.

Figure 11:
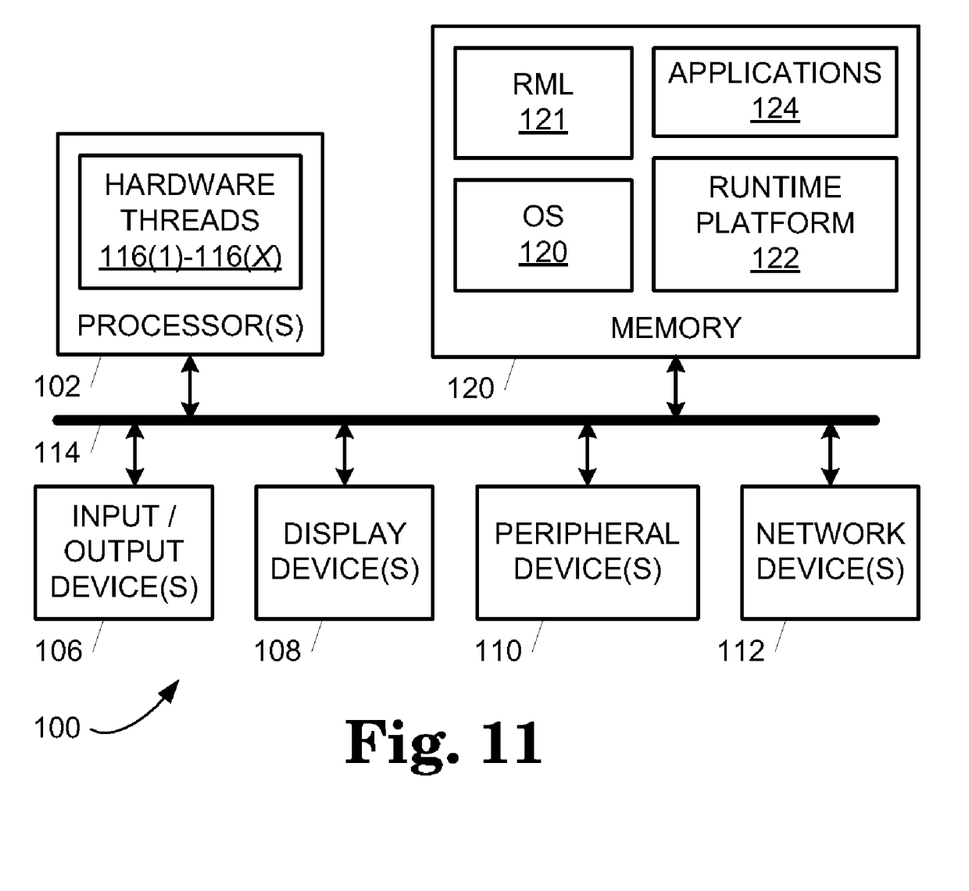
FIG. 11 is a block diagram illustrating an embodiment of a computer system configured to implement a runtime environment with a process scheduler.

Source-target pattern 10 allows processes to be connected where the processes have no or minimal knowledge about one another. One process may provide data to another process using source-target pattern 10 without any knowledge of the other process. Similarly, one process may receive data from another process using source-target pattern 10 without any knowledge of the other process. Each process includes a set of instructions stored in computer readable storage media (e.g., memory system 104 as shown in FIG. 11) and executable by the computer system. The data transferred between processes may include any type of data including pointers, addresses, or other structured or coded information.

Source interface 12 includes instructions stored in computer readable storage media (e.g., memory system 104 as shown in FIG. 11) and executable by the computer system to implement linktarget, unlinktarget, reserve, release, and consume operations where each of the operations of source interface 12 are invoked by one or more target interfaces 14. Target interface 14 includes instructions stored in computer readable storage media (e.g., memory system 104 as shown in FIG. 11) and executable by the computer system to implement an offer operation where the Offer operation of target interface 14 is invoked by one or more source interfaces 12.

The linktarget operation of source interface 12 establishes a link 16 between source interface 12 and a target interface 14 that invokes the linktarget operation. The unlinktarget operation of source interface 12 disconnects a link 16 between source interface 12 and a target interface 14 that invokes the unlinktarget operation. The linktarget and unlinktarget operation may each return a success or failure indicator to target interface 14 from which the operation invocation was received to indicate whether or not link 16 was successfully established or disconnected.

Subsequent to a link 16 being established between a source interface 12 and a target interface 14, source interface 12 invokes the offer operation of target interface 14 using link 16 to offer data to target interface 14. In response to the offer invocation, target interface 14 returns one of accepted, declined, or postponed. Target interface 14 returns accepted to indicate that target interface 14 consumed the data offered by source interface 12. Target interface 14 returns declined to indicate that target interface 14 is not interested in the data offered by source interface 12. Target interface 14 returns postponed to indicate that target interface 14 in not ready to consume the data offered by source interface 12 at this point in time.

Source interface 12 allows target interface 14 to request data that was previously offered using the reserve operation. Target interface 14 invokes the reserve operation to place a reservation on data that was offered by source interface 12 but was postponed by target interface 14. Source interface 12 returns a success or failure indicator to target interface 14 from which the reserve invocation was received to indicate whether or not the reservation was successful.

Subsequent to reserving data, target interface 14 either invokes the release operation of source interface 12 to release an earlier placed reservation or the consume operation to consume the reserved data. After source interface 12 confirms a reservation of data to target interface 14 by providing a success indicator to target interface 14, source interface 12 holds the data for the target interface 14 that placed the reservation until the data is either released or consumed by the target interface 14 that placed the reservation.

Figure 1B:
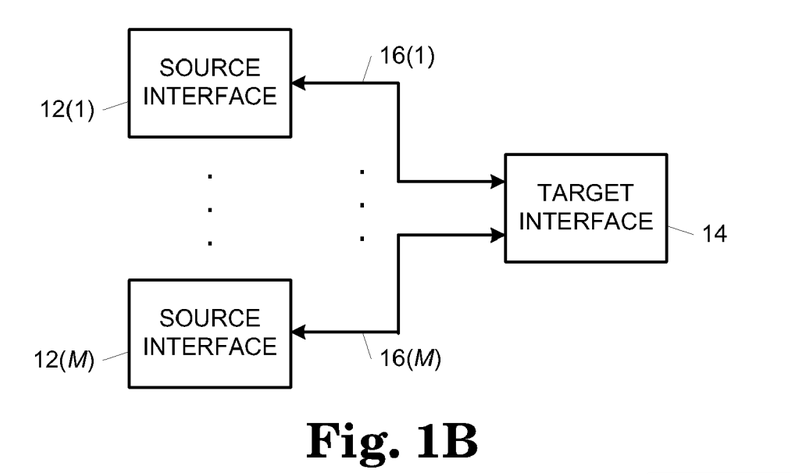

As shown in FIG. 1B, each target interface 14 may connect to any number of source interfaces 12(1)-12(M) by invoking the linktarget operation of each source interface 12(1)-12(M) to establish respective links 16(1)-16(M), where M is an integer greater than or equal to one and represents the Mth source interface 12 and the Mth link 16. Accordingly, each target interface 14 may be offered data from any number of source interfaces 12(1)-12(M).

Figure 1C:
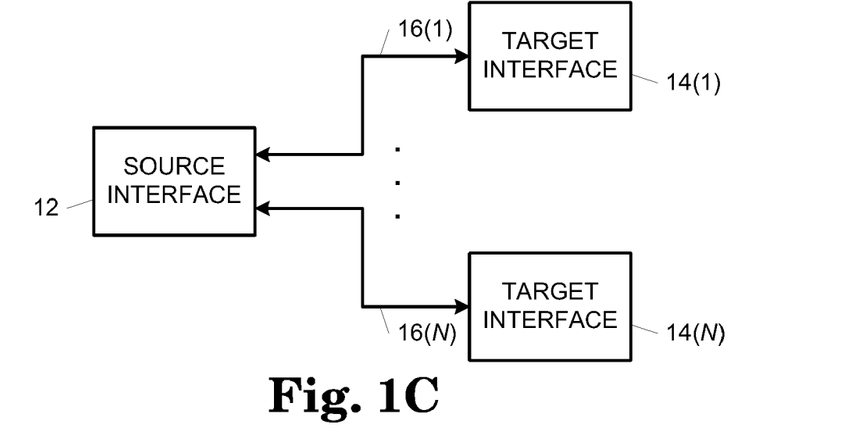

As shown in FIG. 1C, each source interface 12 may connect to any number of target interfaces 14(1)-14(N) in response to linktarget operation invocations from each target interface 14(1)-14(N) that establish respective links 16(1)-16(N), where N is an integer greater than or equal to one and represents the Nth target interface 14 and the Nth link 16. Accordingly, each source interface 12 may offer data to any number of target interfaces 14(1)-14(N).

Figure 2A:
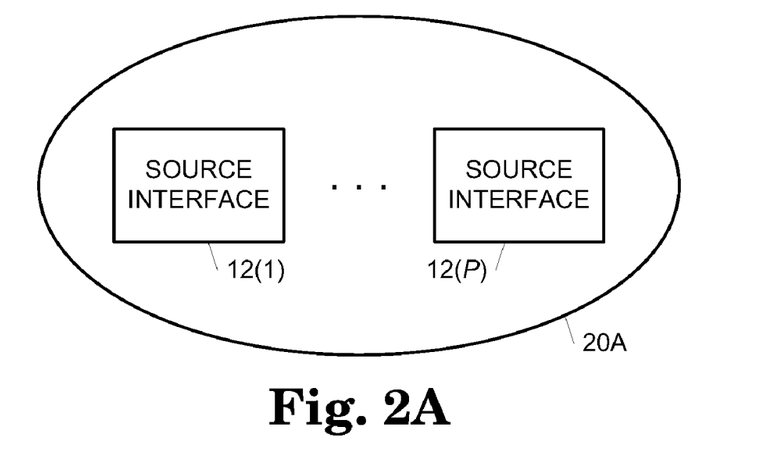
FIGS. 2A-2C are block diagrams illustrating embodiments of nodes of a data flow network.
Figure 2B:
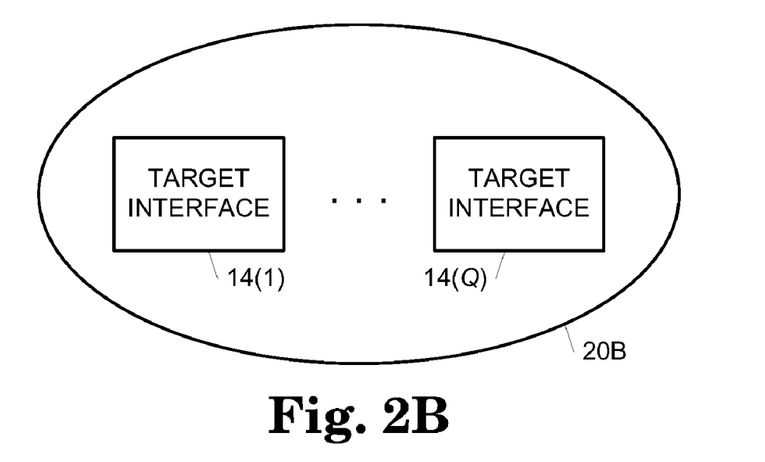
Figure 2C:
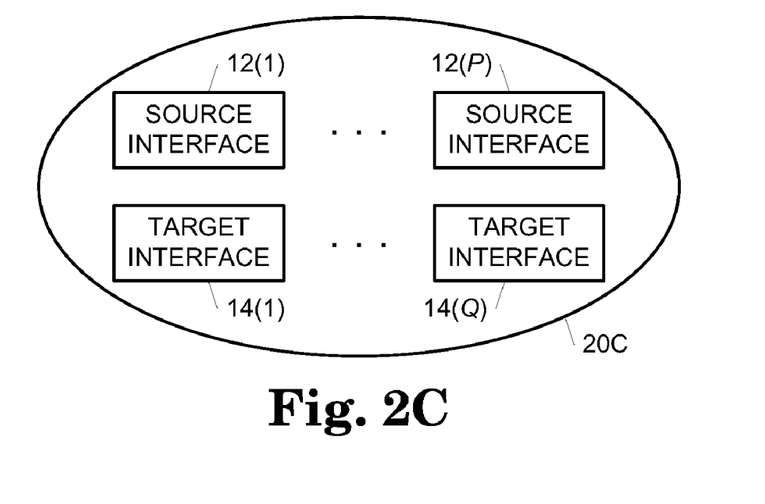

FIGS. 2A-2C are block diagrams illustrating embodiments 20A, 20B, and 20C, respectively, of a node 20 of a data flow network. As shown in FIG. 2A, a node 20A may include one or more source interfaces 12(1)-12(P), where P is an integer greater than or equal to one and represents the Pth source interface 12, but no target interfaces 14. Nodes 20A with only source interfaces 12 form data originators. A node 20B may include one or more target interfaces 14(1)-14(Q), where Q is an integer greater than or equal to one and represents the Qth target interface 14, but no source interfaces 12 as shown in FIG. 2B. Nodes 20B with only target interfaces 14 form data sinks. In addition, a node 20C may include one or more source interfaces 12(1)-12(P) and one or more target interfaces 14(1)-14(Q) as shown in FIG. 2C. Each of the nodes 20A, 20B, and 20C may also include one or more passive processing units (not shown) configured to transform data as it is propagated through nodes 20A, 20B, and 20C.

Data flows through a data flow network by being handed off from one node 20 to one or more other nodes 20 using source-target pattern 10. Each connection of two nodes 20 in a data flow network is represented by a pairing of a node 20 implementing source interface 12 (e.g., a node 20A or a node 20C) with a node implementing a target interface 14 (e.g., a node 20B or a node 20C).

Any number of data flow network components may be defined using source-target pattern 10, and the components may be combined into largely arbitrary data flow networks. Examples of data flow networks include unbounded buffers, bounded buffers, single-assignment blocks, producer/consumer buffers, data sinks (method invocation), data transforms, timers, and I/O processors. Data flow networks may also be composed from more complex networks using source-target pattern 10. For example, a reader/writer lock implementation or a monitor implementation may be expressed in terms of data flow networks using source-target pattern 10.

Figure 3:
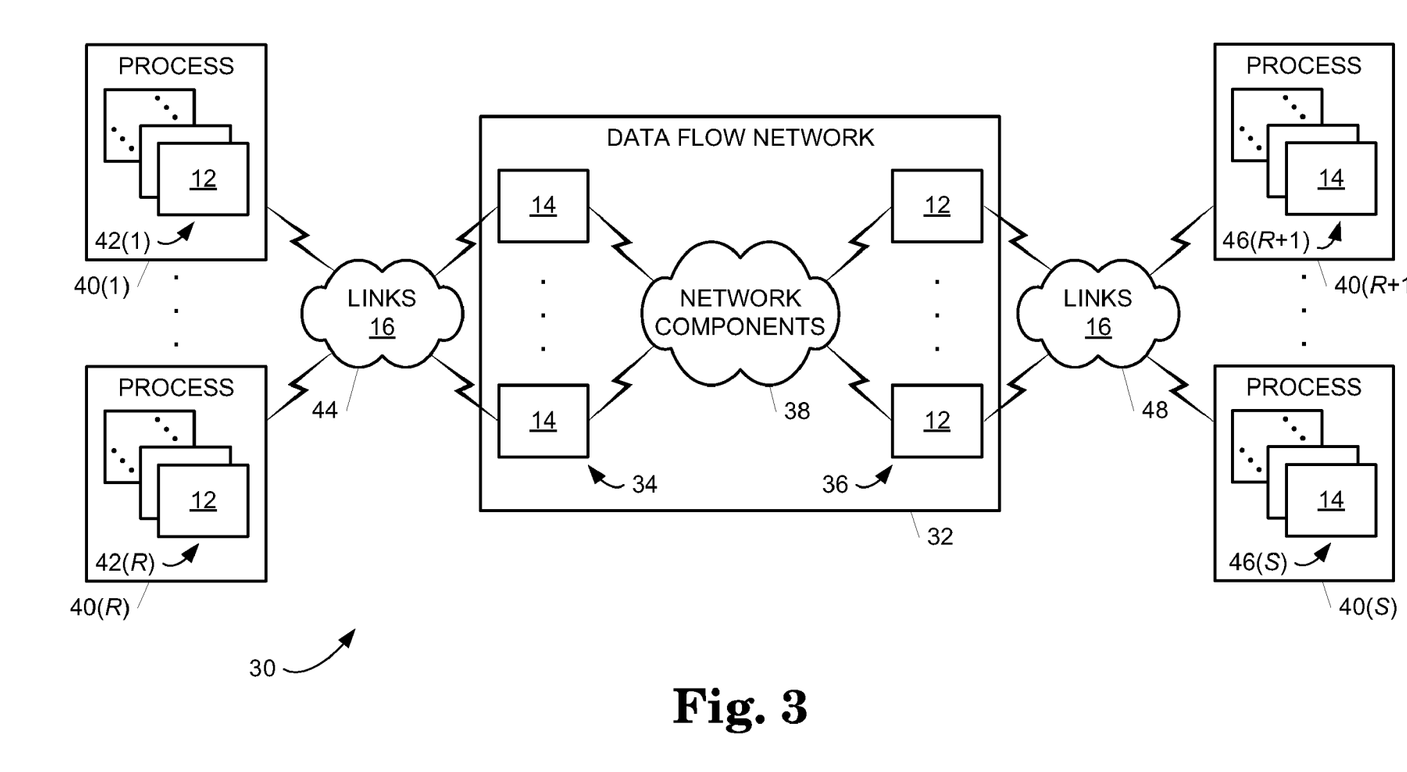
FIG. 3 is a block diagram illustrating an embodiment of a process network with a data flow network connected to processes.

Any number of processes may provide data into a data flow network, and any number of processes may receive data from a data flow network as shown in FIG. 3. FIG. 3 is a block diagram illustrating an embodiment of a process network 30 with a data flow network 32 connected to processes 40(1)-40(R) and 40(R+1)-40(S), where R is an integer greater than or equal to one, S is an integer greater than or equal to two, R is less than S, and represent the Rth and the Sth process 40.

Data flow network 32 forms a passive data flow construct configured to propagate data from to processes 40(1)-40(R) to processes 40(R+1)-40(S). Data flow network 32 includes a set 34 of one or more target interfaces 14, a set 36 of one or more source interfaces 12, and a set of network components 38 that includes nodes 20 and passive processing blocks and interconnects the set 34 of target interfaces 14 with the set 36 of source interfaces 12. Network components 38 may include any suitable type, number, and/or combination of nodes 20 and passive processing blocks that connect the set 34 of target interfaces 14 with the set 36 of source interfaces 12 in any suitable way.

Processes 40(1)-40(R) include respective sets 42(1)-42(R) of one or more source interfaces 12 where each set 42 may include the same or a different number of source interfaces 12 as other sets 42. The set 34 of target interfaces 14 establishes a set 44 of links 16 between the set 34 of target interfaces 14 and the sets 42(1)-42(R) of source interfaces 12. As illustrated in FIGS. 1B and 1C, each target interface 14 in set 44 may connect to any number of source interfaces 12 in sets 42(1)-42(R), and any number of target interfaces 14 in set 44 may connect to each source interface 12 in sets 42(1)-42(R). Each source interface 12 in sets 42(1)-42(R) causes data to be propagated from processes 40(1)-40(R) into data flow network 32 by offering data to one or more target interfaces 14 in set 44 as described above with reference to FIG. 1A. One or more of processes 40(1)-40(R) may also include one or more additional sets of source interfaces 12 (not shown) and/or one or more sets of target interfaces 14 (not shown) that connect to one or more other data flow networks 32 (not shown).

Processes 40(R+1)-40(S) include respective sets 46(R+1)-46(S) of one or more target interfaces 14 where each set 46 may include the same or a different number of target interfaces 14 as other sets 46. The sets 46(R+1)-46(S) of target interfaces 14 establish a set 48 of links 16 between the sets 46(R+1)-46(S) of target interfaces 14 and the set 36 of source interfaces 12. As illustrated in FIGS. 1B and 1C, each target interface 14 in sets 46(R+1)-46(S) may connect to any number of source interfaces 12 in set 36, and any number of target interfaces 14 in sets 46(R+1)-46(S) may connect to each source interface 12 in set 36. Each source interface 12 in set 36 causes data to be propagated from data flow network 32 to one or more of processes 40(R+1)-40(S) by offering data to one or more target interfaces 14 in sets 46(R+1)-46(S) as described above with reference to FIG. 1A. One or more of processes 40(R+1)-40(S) may also include one or more additional sets of target interfaces 14 (not shown) and/or one or more sets of source interfaces 12 (not shown) that connect to one or more other data flow networks 32 (not shown).

Processes 40(1)-40(R) may provide data to processes 40(R+1)-40(S) using data flow network 32 without any knowledge of processes 40(R+1)-40(S). Similarly, processes 40(R+1)-40(S) may receive data from processes 40(1)-40(R) using data flow network 32 without any knowledge of processes 40(1)-40(R).

Figure 4:
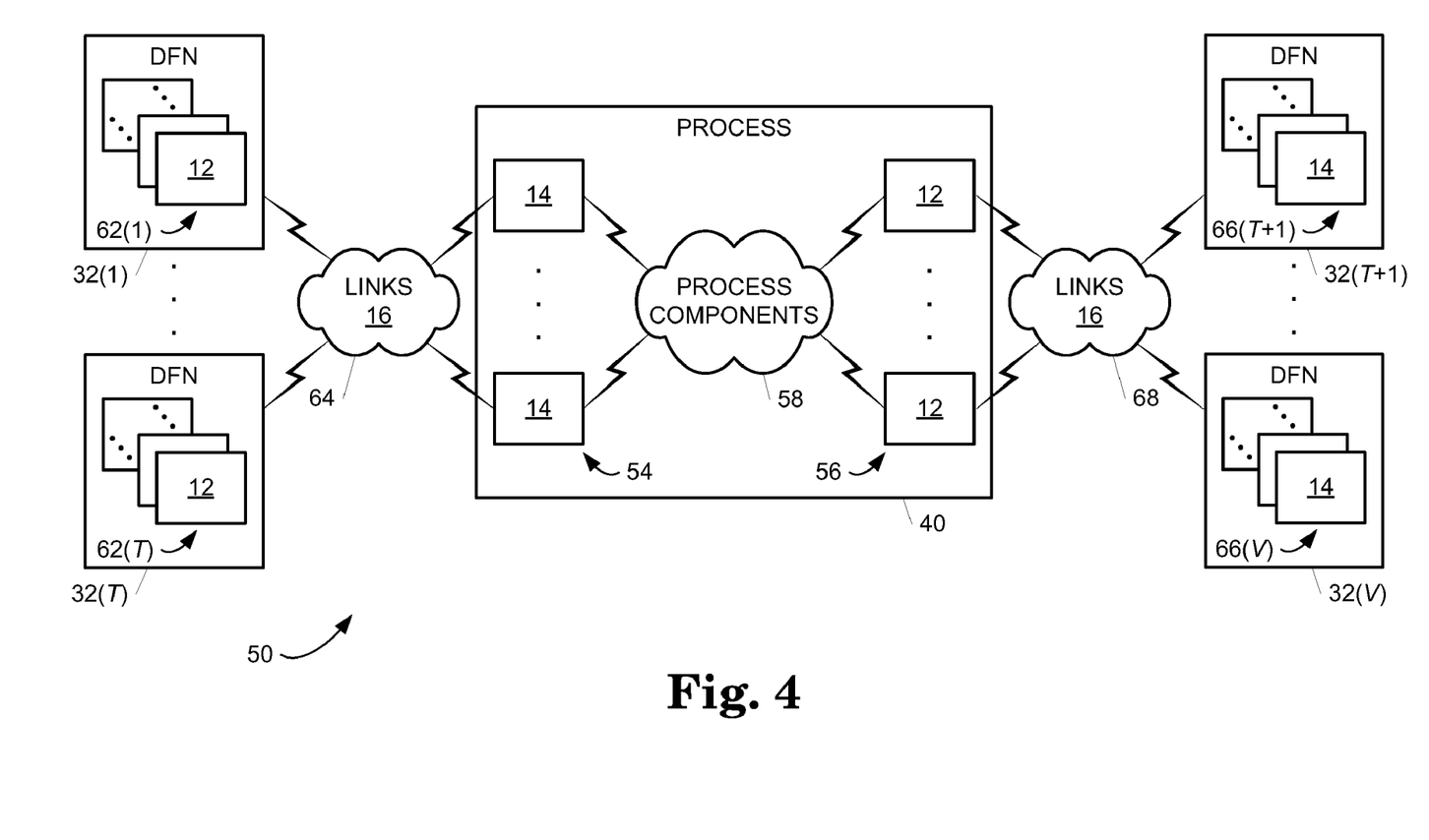
FIG. 4 is a block diagram illustrating an embodiment of a process network with a process connected to data flow networks.

A process may provide data into any number of data flow networks and receive data from any number of data flow networks as shown in FIG. 4. FIG. 4 is a block diagram illustrating an embodiment of a process network 50 with a process 40 connected to data flow networks 32(1)-32(T) and 32(T+1)-32(V), where T is an integer greater than or equal to one, V is an integer greater than or equal to two, T is less than V, and represent the Tth and the Vth data flow network 32.

Process 40 includes a set of instructions of a program that are configured to receive data from data flow networks 32(1)-32(T) and provide data to data flow networks 32(T+1)-32(V). Process 40 includes a set 54 of one or more target interfaces 14, a set 56 of one or more source interfaces 12, and a set of process components 58 and interconnects the set 54 of target interfaces 14 with the set 56 of source interfaces 12. Process components 58 may include any suitable type, number, and/or combination of instructions and/or data structures that connect the set 54 of target interfaces 14 with the set 56 of source interfaces 12 in any suitable way.

Data flow networks 32(1)-32(T) include respective sets 62(1)-62(T) of one or more source interfaces 12 where each set 62 may include the same or a different number of source interfaces 12 as other sets 62. The set 54 of target interfaces 14 establishes a set 64 of links 16 between the set 54 of target interfaces 14 and the sets 62(1)-62(T) of source interfaces 12. As illustrated in FIGS. 1B and 1C, each target interface 14 in set 54 may connect to any number of source interfaces 12 in sets 62(1)-62(T), and any number of target interfaces 14 in set 54 may connect to each source interface 12 in sets 62(1)-62(T). Each source interface 12 in sets 62(1)-62(T) causes data to be propagated from data flow networks 32(1)-32(T) into process 40 by offering data to one or more target interfaces 14 in set 54 as described above with reference to FIG. 1A. Data flow networks 32(1)-32(T) each include one or more sets of target interfaces 14 (not shown) that connect to one or more other processes 40 (not shown). Data flow networks 32(1)-32(T) may also include one or more additional sets of source interfaces 12 (not shown) and/or one or more sets of target interfaces 14 (not shown) that connect to one or more other processes 40 (not shown).

Data flow networks 32(T+1)-32(V) include respective sets 66(T+1)-46(V) of one or more target interfaces 14 where each set 66 may include the same or a different number of target interfaces 14 as other sets 66. The sets 66(T+1)-46(V) of target interfaces 14 establish a set 68 of links 16 between the sets 66(T+1)-46(V) of target interfaces 14 and the set 56 of source interfaces 12. As illustrated in FIGS. 1B and 1C, each target interface 14 in sets 66(T+1)-46(V) may connect to any number of source interfaces 12 in set 56, and any number of target interfaces 14 in sets 66(T+1)-46(V) may connect to each source interface 12 in set 56. Process 40 causes data to be propagated into one or more of data flow networks 32(T+1)-32(V) by causing each source interface 12 in set 56 to offer data to one or more target interfaces 14 in sets 66(T+1)-46(V) as described above with reference to FIG. 1A. Data flow networks 32(T+1)-32(V) may also include one or more sets of source interfaces 12 (not shown) and/or one or more sets of target interfaces 14 (not shown) that connect to one or more other processes 40 (not shown).

Figures 5, 6:
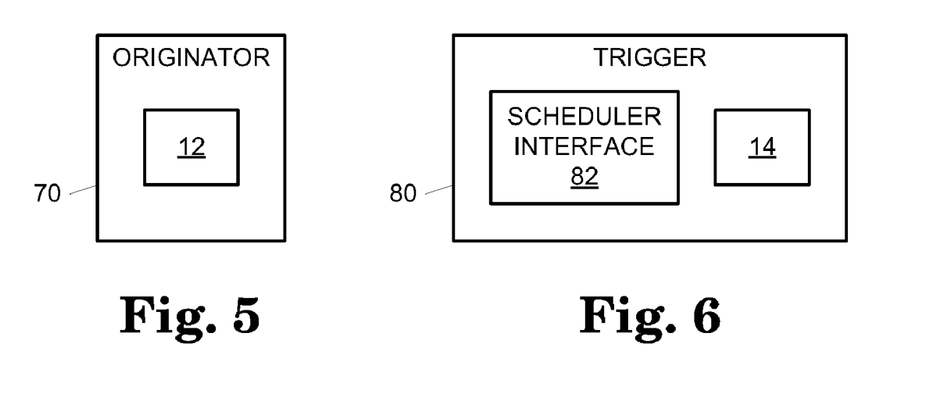
FIG. 5 is a block diagram illustrating an embodiment of an originator block configured to implement a send operation.
FIG. 6 is a block diagram illustrating an embodiment of a trigger block configured to implement a receive operation.

FIG. 5 is a block diagram illustrating an embodiment of an originator block 70 configured to implement a send operation. Originator block 70 includes a source interface 12 but does not include any target interfaces 14. Originator block 70 is included in a process 40 to allow process 40 to propagate data into a data flow network 32. Accordingly, originator block 70 implements a send operation by receiving data from process 40 and providing the data into one or more connected data flow networks 32.

Originator block 70 may or may not interact with an underlying process scheduler that schedules processes 40 for execution in the computer system. Thus, originator block 70 may not include an interface to the scheduler.

FIG. 6 is a block diagram illustrating an embodiment of a trigger block 80 configured to implement a receive operation. Trigger block 80 includes a target interface 14 but does not include any source interfaces 12. Trigger block 80 is included in a process 40 to allow process 40 to receive data from a data flow network 32. Trigger block 80 acts as a termination point or one of any number of termination points for the data flow network 32. Accordingly, trigger block 80 implements a receive operation by receiving data from a data flow network 32 and providing the data to process 40.

Trigger block 80 also includes a scheduler interface 82. Scheduler interface 82 interacts with an underlying process scheduler that schedules process 40 for execution in the computer system. In particular, scheduler interface 82 operates with the scheduler to cause process 40 to be paused (e.g., blocked) in response to a receive operation involving trigger block 80 being commenced when data is not immediately available. Scheduler interface 82 also operates with the scheduler to cause process 40 to be resumed (e.g., unblocked) in response to data of a receive operation involving trigger block 80 arriving at trigger block 80.

Figure 7:
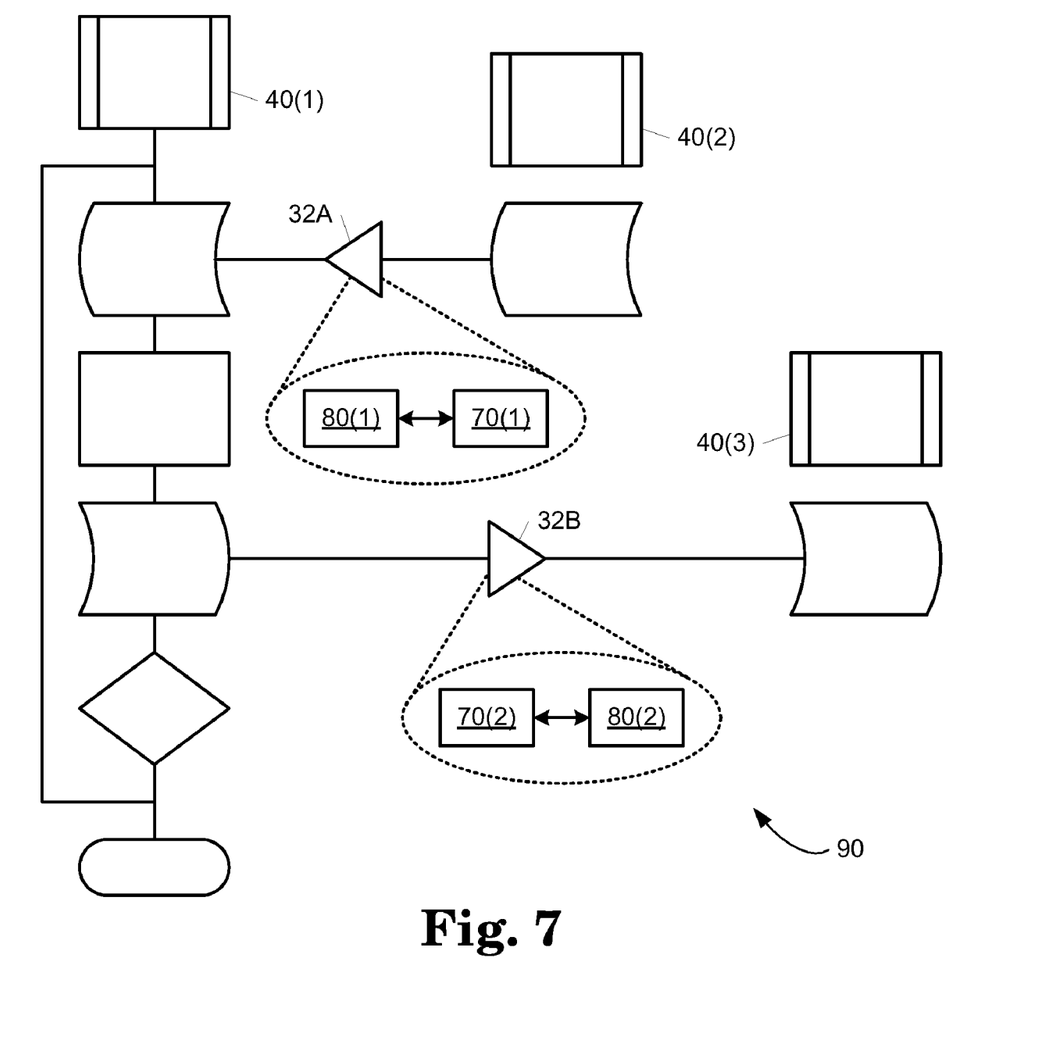
FIG. 7 is a block diagram illustrating an embodiment of a process network.

FIG. 7 is a block diagram illustrating an embodiment of a process network 90 that includes send and receive operations. In FIG. 7, a process 40(1) receives data from a process 40(2) and provides data to a process 40(3). To receive data from process 40(2), a trigger block 80(1) of process 40(1) is offered data from an originator block 70(1) of process 40(2) and trigger block 80(1) accepts the data as indicated by a data flow network 32A that implements a receive operation. Process 40(1) performs some computation on the data and sends the resulting data to process 40(3). To send the data to process 40(3), an originator block 70(2) of process 40(1) offers data to a trigger block 80(2) of process 40(3) and trigger block 80(2) accepts the data as indicated by a data flow network 32B that implements a send operation.

Figure 8:
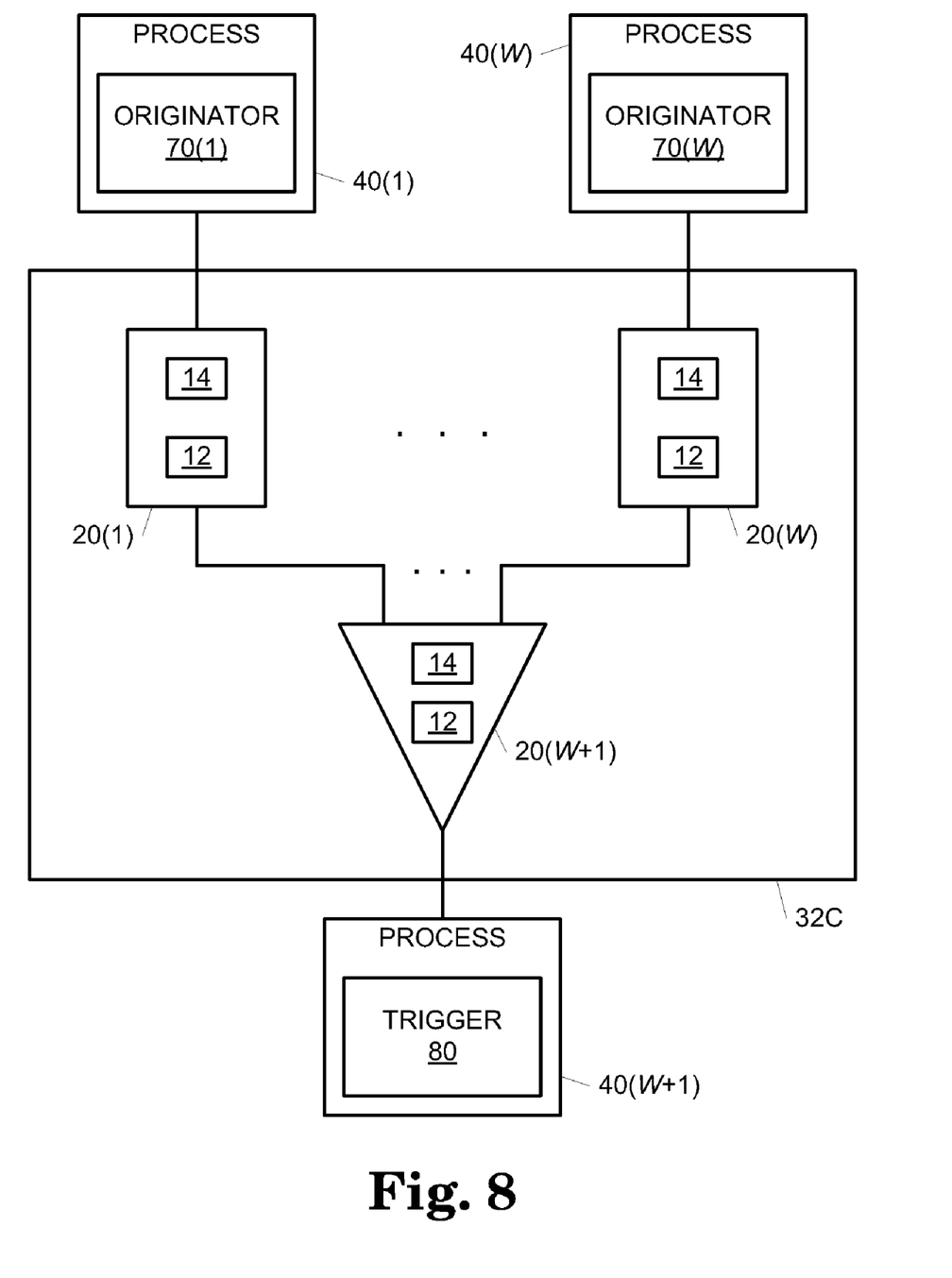
FIG. 8 is a block diagram illustrating an embodiment of a data flow network configured to implement choice and join operations.

FIG. 8 is a block diagram illustrating an embodiment of a data flow network 32 configured to implement choice and join operations. Data flow network 32 includes nodes 20(1)-20(W+1) where W is an integer greater than or equal to two and represents the Wth node 20, the Wth process 40, and the Wth originator block 70. Each node 20(1)-20(W+1) includes a source interface 12 and a target interface 14. Target interfaces 14 in nodes 20(1)-20(W) receive data from respective originator blocks 70(1)-70(W) in respective processes 40(1)-40(W). Source interfaces 12 in nodes 20(1)-20(W) each provide data to a target interface 14 in node 20(W+1). Source interface 12 in node 20(W+1) provides data to trigger block 70 in process 40(W+1).

To implement the choice operation, node 20(W+1) accepts data from only the first of nodes 20(1)-20(W) to offer data to node 20(W+1) and declines data offers from all of the remaining nodes 20(1)-20(W). Node 20(W+1) provides the data to trigger block 80 in process 40(W+1).

In one embodiment, each node 20(1)-20(W) is configured to use its respective source interface 12 to offers its identity as the data to node 20(W+1) in response to being offered data from respective originator blocks 70(1)-70(W). Node 20(W+1) uses its target interface 14 to accept the first identity offered from the set of nodes 20(1)-20(W) and to decline all subsequent identities offered from the set of nodes 20(1)-20(W). The node 20(1)-20(W) that receives the accept response from node 20(W+1) using its source interface 12 accepts the data offered from the respective originator block 70(1)-70(W) using its target interface 14. The nodes 20(1)-20(W) that receive the decline responses from node 20(W+1) using their respective source interfaces 12 decline the data offered from the respective originator blocks 70(1)-70(W) using their respective target interfaces 14. Node 20(W+1) uses its source interface 12 to offer the accepted identity as the data to trigger block 70 in process 40(W+1). Trigger block 70 responds by accepting the identity from node 20(W+1). Process 40(W+1) then retrieves the data of the choice operation from the node 20(1)-20(W) using the identity received from node 20(W+1).

In another embodiment, nodes 20(1)-20(W) may be omitted and node 20(W+1) may receive data directly from originator blocks 70(1)-70(W). In this embodiment, originator blocks 70(1)-70(W) offer data to node 20(W+1). Node 20(W+1) uses its target interface 14 to accept the first data offered from the set of originator blocks 70(1)-70(W) and to decline all subsequent data offered from the set of originator blocks 70(1)-70(W). Node 20(W+1) uses its source interface 12 to offer the accepted data to trigger block 70 in process 40(W+1). Trigger block 70 responds by accepting the data from node 20(W+1) to complete the choice operation.

In other embodiments, the choice operation may be implemented in data flow network 32C using other combinations of the source-target pattern 10 that interface with other combinations of originator blocks 70 and/or trigger blocks 80.

Figure 9:
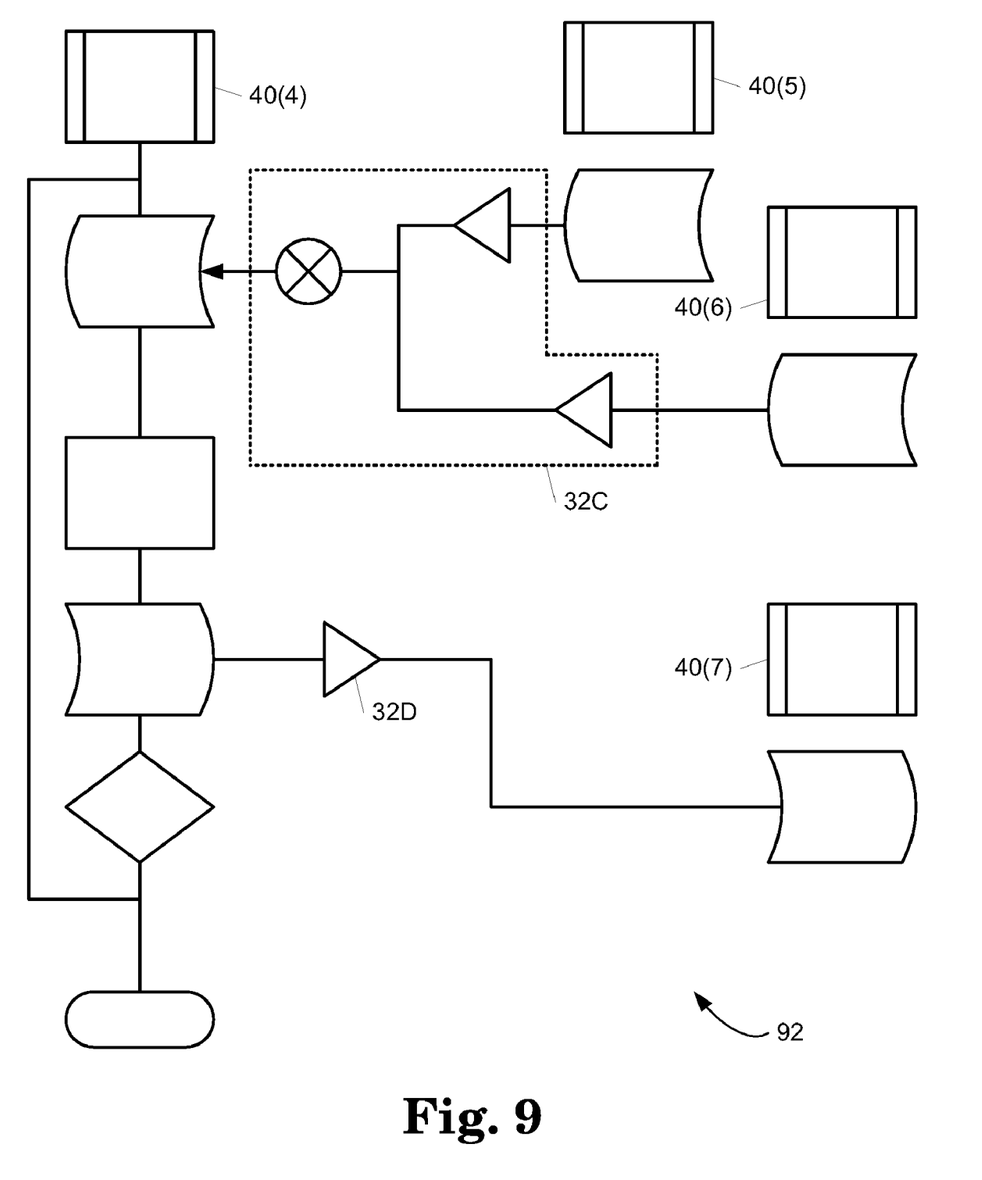
FIG. 9 is a block diagram illustrating an embodiment of a process network.

FIG. 9 is a block diagram illustrating an embodiment of a process network 92 that includes a choice operation. In FIG. 9, the choice operation is implemented between a process 40(4) and processes 40(5) and 40(6) by including data flow network 32C. Using data flow network 32C, process 40(4) accepts data from the first of processes 40(5) and 40(6) that provide the data to data flow network 32C. Process 40(4) performs some computation on the data and sends the resulting data to process 40(7) using a data flow network 32D that implements a send operation.

The embodiment of FIG. 8 may also be used to implement a join operation. To implement the join operation, node 20(W+1) waits to accept data from all of nodes 20(1)-20(W) before offering the data from all nodes 20(1)-20(W) to trigger block 80 in process 40(W+1).

In one embodiment, each node 20(1)-20(W) is configured to offers its identity as part of the data offered to node 20(W+1) using source interface 12 in response to being offered data from respective originator blocks 70(1)-70(W). Node 20(W+1) tracks the offers received using its target interface 14 to determine when all nodes 20(1)-20(W) have offered their identities. Node 20(W+1) uses its target interface 14 to respond to all offers, except the last offer, with postponed. In response to offers from all nodes 20(1)-20(W) being received, node 20(W+1) uses its target interface 14 to invoke the reserve operation on all nodes 20(1)-20(W) except the node 20(1)-20(W) that provided the last offer. Node 20(W+1) waits to respond to the node 20(1)-20(W) that provided the last offer received until node 20(W+1) determines whether all reservations succeed or whether any reservations fail.

All nodes 20(1)-20(W) that receive a reserve invocation use their respective target interfaces 14 to invoke the reserve operation on the respective originator blocks 70(1)-70(W). Originator blocks 70(1)-70(W) respond to the reserve invocations by providing either a success or a fail indicator to the respective invoking nodes 20(1)-20(W). If an originator block 70 no longer holds the offered data or the offered data was reserved by another node 20 (not shown), the originator block 70 responds to the reservation invocation with a fail indication. Otherwise, the originator block 70 responds to the reservation invocation with a success indication.

Nodes 20(1)-20(W) detect failed reservations in response to receiving the fail indicators from respective originator blocks 70(1)-70(W). Nodes 20(1)-20(W) may also detect failed reservations in response to originator blocks 70(1)-70(W) becoming disconnected from respective nodes 20(1)-20(W). Each node 20(1)-20(W) that detects a failed reservation responds to the reservation invocation of node 20(W+1) with a fail indicator. Each node 20(1)-20(W) that receives a success indicator from a respective originator blocks 70(1)-70(W) responds to the reservation invocation of node 20(W+1) with a success indicator.

Node 20(W+1) detects any failed reservations in response to receiving the fail indicators from nodes 20(1)-20(W) or in response to any of nodes 20(1)-20(W) becoming disconnected. If node 20(W+1) detects any failed reservations, node 20(W+1) uses its target interface 14 to invoke the release operation on all nodes 20(1)-20(W) that responded to the reserve invocations with success indicators. Node 20(W+1) also returns postponed to the node 20(1)-20(W) that provided the last offer received by node 20(W+1). In response to receiving the release invocations, nodes 20(1)-20(W) release the successful reservations and, in turn, invoke the release operations on corresponding originator blocks 70(1)-70(W). The originator blocks 70(1)-70(W) release the successful reservations in response to receiving the release invocations from nodes 20(1)-20(W).

If node 20(W+1) detects that all reservations succeeded, node 20(W+1) uses its target interface 14 to invoke the consume operation on all nodes 20(1)-20(W) except the node 20(1)-20(W) that provided the last offer received by node 20(W+1). Node 20(W+1) returns accepted to the node 20(1)-20(W) that provided the last offer and that node 20(1)-20(W), in turn, returns accepted to the corresponding originator block 70(1)-70(W). All nodes 20(1)-20(W) that receive the consume invocation, in turn, use their respective target interfaces 14 to invoke the consume operation on respective originator blocks 70(1)-70(W). Node 20(W+1) uses its source interface 12 to offer the combined data to trigger block 70 in process 40(W+1). Trigger block 70 responds by accepting the data from node 20(W+1) to complete the join operation.

In another embodiment, node 20(W+1) signals trigger block 70 in process 40(W+1) with a Boolean value when all data has been reserved or accepted at nodes 20(1)-20(W). Trigger block 70 retrieves the data from nodes 20(1)-20(W). In this embodiment, node 20(W+1) returns accepted to the last of nodes 20(1)-20(W) that provide data.

In other embodiments, the join operation may be implemented in data flow network 32C using other combinations of the source-target pattern 10 that interface with other combinations of originator blocks 70 and/or trigger blocks 80.

Figure 10:
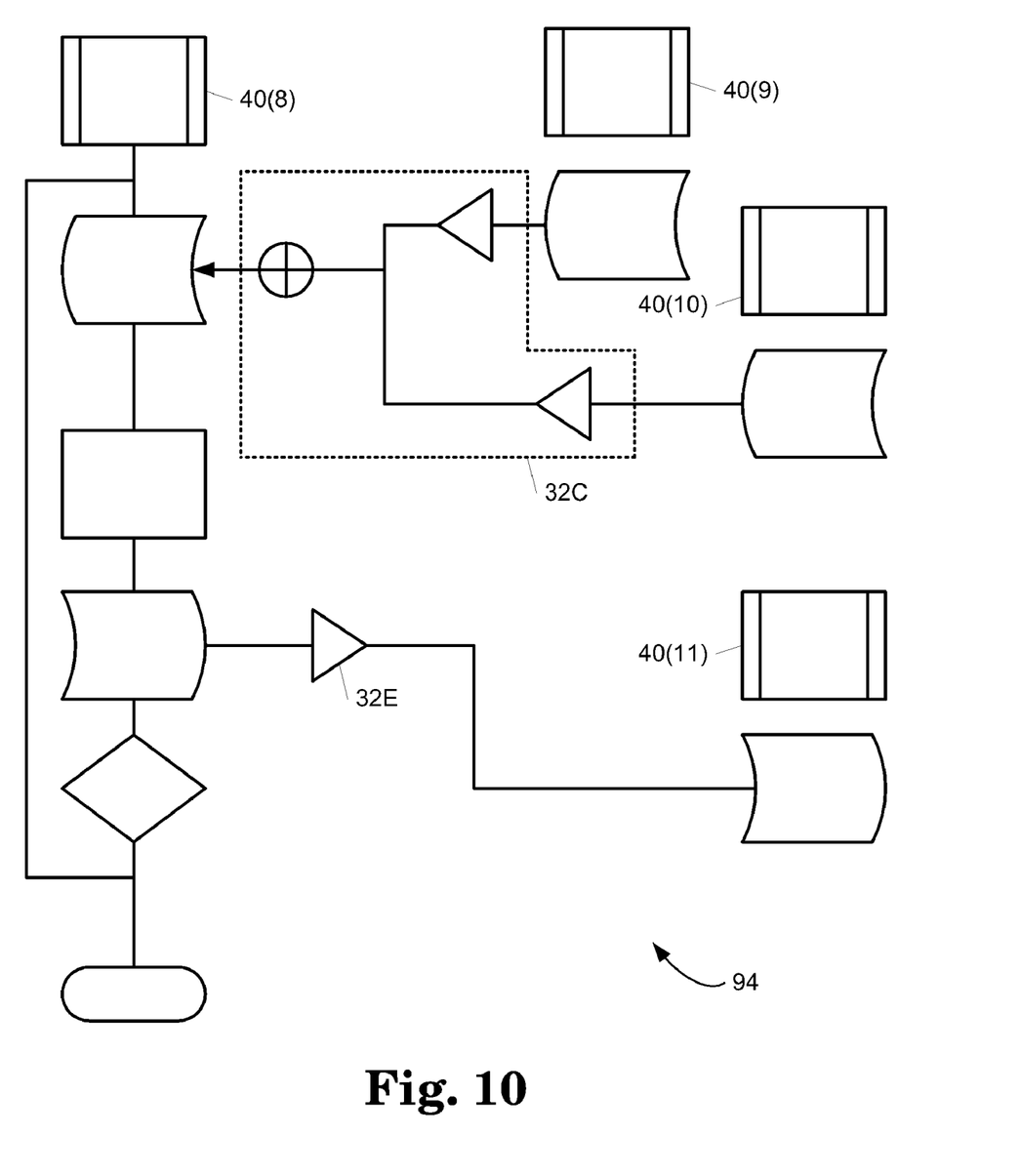
FIG. 10 is a block diagram illustrating an embodiment of a process network.

FIG. 10 is a block diagram illustrating an embodiment of a process network 94 that includes a join operation. In FIG. 10, the join operation is implemented between a process 40(8) and processes 40(9) and 40(10) by including data flow network 32C. Using data flow network 32C, process 40(4) accepts data provided from each of processes 40(9) and 40(10) to data flow network 32C. Process 40(8) performs some computation on the data and sends the resulting data to process 40(11) using a data flow network 32E that implements a send operation.

The operations of send, receive, choice, and join illustrated above with reference to FIGS. 5-10 may be combined into more complex configurations in other embodiments.

FIG. 11 is a block diagram illustrating an embodiment of computer system 100 which is configured to implement a runtime environment including with a process scheduler.

Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 116(1)-116(X) where X is an integer greater than or equal to one and represents the Xth hardware thread 116. Each hardware thread 116 in processor packages 102 is configured to access and execute instructions stored in memory system 104. The instructions may include a basic input output system (BIOS) or firmware (not shown), an operating system (OS) 120, a resource management layer 121, a runtime platform 122, and applications 124. Each hardware thread 116 may execute the instructions in conjunction with or in response to information received from input/output devices 106, display devices 108, peripheral devices 110, and/or network devices 112.

Computer system 100 boots and executes OS 120. OS 120 includes instructions executable by hardware threads 116 to manage the components of computer system 100 and provide a set of functions that allow applications 124 to access and use the components. In one embodiment, OS 120 is the Windows operating system. In other embodiments, OS 120 is another operating system suitable for use with computer system 100.

Resource management layer 121 includes instructions that are executable in conjunction with OS 120 to allocate resources of computer system 100 including hardware threads 116. Resource management layer 121 may be included in computer system 100 as a library of functions available to one or more applications 124 or as an integrated part of OS 120.

Runtime platform 122 includes instructions that are executable in conjunction with OS 120 and resource management layer 121 to generate the runtime environment and provide runtime functions to applications 124. These runtime functions include a scheduler function. When invoked, the scheduler function creates a scheduler that operates to schedule processes of programs, such as applications 124, for execution by one or more hardware threads 116(1)-116(X). The runtime functions may be included in computer system 100 as part of an application 124, as a library of functions available to one or more applications 124, or as an integrated part of OS 120 and/or resource management layer 121.

Each application 124 includes instructions that are executable in conjunction with OS 120, resource management layer 121, and/or runtime platform 122 to cause desired operations to be performed by computer system 100. Each application 124 represents one or more programs that may execute with a scheduler provided by runtime platform 122.

Memory system 104 includes any suitable type, number, and configuration of volatile or non-volatile storage devices configured to store instructions and data. The storage devices of memory system 104 represent computer readable storage media that store computer-executable instructions including OS 120, resource management layer 121, runtime platform 122, and applications 124. The instructions are executable by computer system to perform the functions and methods of OS 120, resource management layer 121, runtime platform 122, and applications 124 described herein. Examples of storage devices in memory system 104 include hard disk drives, random access memory (RAM), read only memory (ROM), flash memory drives and cards, and magnetic and optical disks.

Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

In the embodiment of FIG. 11, one or more of OS 120, resource management layer 121, runtime platform 122, and applications 124 may include process networks with processes 40 connected using data flow networks 32 that include any suitable number of source-target patterns 10 as described above with reference to FIGS. 1A-10.

The above embodiments provide a compositional model referred to as the source-target pattern for connecting processes into process networks in a general, flexible, and extensible manner. The model allows common process algebra constructs to be combined with data flow networks to form process networks. Typical process algebraic operations such as send, receive, choice, and join may be expressed in terms of the compositional model to form data flow networks that provide fully interoperable process algebraic operations between processes. The model may be applied to a wide array of simple data flow networks as well as more complex data flow networks.

The model also allows for loosely connected process networks. With loosely connected process networks, a process may have no or limited knowledge of the other processes with which the process is interacting. The process, instead, knows the connection points with the other processes and the significance of the connection points.

Loosely connected process networks may be used to achieve highly maintainable programs and allow for more complex and sophisticated routing logic based on data flow constructs. A passive data flow network may more efficiently route data from one process to another than active processes acting as intermediaries.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of performed in a computer system, the method comprising:
    invoking a first link operation in a first source interface with a first target interface that creates a first link between the first source operation and the first target interface;
    invoking a first offer operation in the first target interface to offer first data from the first source interface to the first target interface;
    invoking a first reserve operation in the first source interface with the first target interface subsequent to the first offer operation being invoked; and
    invoking a consume operation in the first source interface with the first target interface to consume the first data with the first target interface.

2. The method of claim 1 further comprising:
    returning postponed from the first target interface to the first source interface in response to the first offer operation; and
    invoking the first reserve operation in the first source interface with the first target interface to reserve the first data for the first target interface subsequent to returning postponed.

3. The method of claim 2 further comprising:
    invoking the consume operation in the first source interface with the first target interface to consume the first data with the first target interface subsequent to invoking the first reserve operation.

4. The method of claim 2 further comprising:
    invoking a release operation in the first source interface with the first target interface to release the first data subsequent to invoking the first reserve operation.

5. The method of claim 1 further comprising:
    invoking a second link operation in a second source interface with the first target interface that creates a second link between the second source operation and the first target interface;
    invoking a second offer operation in the first target interface to offer second data from the second source interface to the first target interface; and
    invoking a second reserve operation in the second source interface with the first target interface subsequent to the second offer operation being invoked.

6. The method of claim 5 further comprising:
    invoking a first consume operation in the first source interface with the first target interface to consume the first data with the first target interface subsequent to invoking the first reserve operation; and
    invoking a second consume operation in the second source interface with the first target interface to consume the second data with the first target interface subsequent to invoking the second reserve operation.

7. The method of claim 5 further comprising:
    invoking a first release operation in the first source interface with the first target interface to release the first data subsequent to invoking the first reserve operation; and
    invoking a second release operation in the second source interface with the first target interface to release the second data subsequent to invoking the second reserve operation.

8. A computer readable storage medium, which is not a carrier wave, storing computer-executable instructions that, when executed by a computer system, perform a method, the method comprising:
    providing first data from a first process to a data flow network using a first source-target pattern that includes at least link, offer, reserve, release, and consume operations;
    providing the first data from the data flow network to a second process using a second source-target pattern that includes at least the link, the offer, the reserve, the release, and the consume operations.

9. The computer readable storage medium of claim 8, the method further comprising:
    providing second data from a third process to the data flow network using a third source-target pattern that includes at least the link, the offer, the reserve, the release, and the consume operations; and
    providing the first data from the data flow network to the second process using the second source-target pattern in response to the first data being provided to the data flow network prior to the second data being provided to the data flow network.

10. The computer readable storage medium of claim 8, the method further comprising:
providing second data from a third process to the data flow network using a third source-target pattern that includes at least the link, the offer, the reserve, the release, and the consume operations; and
providing the first data and the second data from the data flow network to the second process using the second source-target pattern subsequent to the first data and the second data being provided to the data flow network.

11. The computer readable storage medium of claim 8, the method further comprising:
transforming the first data in the data flow network prior to providing the first data from the data flow network to the second process.

12. The computer readable storage medium of claim 8, the method further comprising:
pausing the second process prior to providing the first data from the data flow network to the second process.

13. The computer readable storage medium of claim 8, the method further comprising:
providing the first data from the data flow network to a third process using a third source-target pattern that includes at least the link, the offer, the reserve, the release, and the consume operations.

14. A method performed by a data flow network in a computer system comprising:
establishing a first link between a first source interface in a first process that includes at least reserve, release, and consume operations and a first target interface in the data flow network that includes at least an offer operation;
establishing a second link between a second source interface in the data flow network that includes at least the reserve, the release, and the consume operations and a second target interface in a second process that includes at least the offer operation; and
providing first data received from the first process using the first link to the second process using the second link.

15. The method of claim 14 further comprising:
establishing a third link between a third source interface in a third process that includes at least the reserve, the release, and the consume operations and the first target interface in the data flow network.

16. The method of claim 14 further comprising:
establishing a third link between a third source interface in the first process that includes at least the reserve, the release, and the consume operations and a third target interface in the data flow network that includes at least the offer operation.

17. The method of claim 14 further comprising:
establishing a third link between a third source interface in a third process that includes at least the reserve, the release, and the consume operations and a third target interface in the data flow network that includes at least the offer operation.

18. The method of claim 14 further comprising:
establishing a third link between a third source interface in the data flow network that includes at least the reserve, the release, and the consume operations and the second target interface in the second process.

19. The method of claim 14 further comprising:
establishing a third link between a third source interface in the data flow network that includes at least the reserve, the release, and the consume operations and a third target interface in the second process that includes at least the offer operation.

20. The method of claim 14 further comprising:
establishing a third link between a third source interface in the data flow network that includes at least the reserve, the release, and the consume operations and a third target interface in a third process that includes at least the offer operation.

* * * * *